United States Patent
Nozawa et al.

(10) Patent No.: US 8,091,666 B2
(45) Date of Patent: Jan. 10, 2012

(54) ELECTRICALLY POWERED VEHICLE, CONTROL DEVICE FOR ELECTRICALLY POWERED VEHICLE, AND COMPUTER READABLE MEDIUM

(75) Inventors: Natsuki Nozawa, Toyota (JP); Takashi Hamatani, Aichi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 262 days.

(21) Appl. No.: 12/615,494

(22) Filed: Nov. 10, 2009

(65) Prior Publication Data

US 2010/0116575 A1   May 13, 2010

(30) Foreign Application Priority Data

Nov. 11, 2008   (JP) .................................. 2008-288418

(51) Int. Cl.
 *B60W 10/04* (2006.01)
(52) U.S. Cl. ............................... 180/65.285; 180/65.265
(58) Field of Classification Search ............. 180/65.265, 180/65.275, 65.245, 62.285, 165, 168, 170; 701/22, 99, 20; 323/271, 223, 235; 318/433, 318/434, 139, 376
See application file for complete search history.

(56) References Cited

U.S. PATENT DOCUMENTS

| | | | | |
|---|---|---|---|---|
| 5,455,491 A * | 10/1995 | Hajagos et al. | ............... | 323/223 |
| 5,589,743 A * | 12/1996 | King | ........................ | 180/65.245 |
| 5,710,699 A * | 1/1998 | King et al. | ..................... | 323/271 |
| 5,777,377 A * | 7/1998 | Gilmore | ........................ | 257/584 |
| 6,335,577 B1 * | 1/2002 | Baba | ................................ | 307/28 |
| 7,205,731 B2 * | 4/2007 | Nagayama | ............... | 180/65.285 |
| 7,426,975 B2 * | 9/2008 | Toyota et al. | ................. | 180/165 |
| 7,443,116 B2 | 10/2008 | Kutsuna et al. | | |
| 7,486,036 B2 * | 2/2009 | Oyobe et al. | .................. | 318/376 |
| 7,773,353 B2 * | 8/2010 | Uchida | .......................... | 361/49 |
| 7,852,029 B2 * | 12/2010 | Kato et al. | ..................... | 318/434 |
| 8,013,548 B2 * | 9/2011 | King et al. | ..................... | 318/139 |
| 8,013,556 B2 * | 9/2011 | Hattori et al. | ................. | 318/433 |
| 2009/0021198 A1 | 1/2009 | Okamura et al. | | |
| 2009/0125173 A1 * | 5/2009 | Komatsu et al. | ......... | 180/65.265 |
| 2010/0087973 A1 * | 4/2010 | Kaita et al. | ............... | 180/65.275 |
| 2010/0296204 A1 * | 11/2010 | Ichikawa et al. | ................ | 361/15 |
| 2011/0082612 A1 * | 4/2011 | Ichikawa | ........................ | 701/22 |

FOREIGN PATENT DOCUMENTS

| | | |
|---|---|---|
| JP | 2003199205 A | 7/2003 |
| JP | 2007120382 A | 5/2007 |
| JP | 2007124746 A | 5/2007 |
| JP | 2007143303 A | 6/2007 |
| JP | 2007259631 A | 10/2007 |
| JP | 2008054433 A | 3/2008 |

* cited by examiner

*Primary Examiner* — Hau Phan
(74) *Attorney, Agent, or Firm* — Gifford, Krass, Sprinkle, Anderson & Citkowski, P.C.

(57) ABSTRACT

An electrically powered vehicle includes: a boost converter that boosts a power supply voltage and outputs a boosted voltage; an inverter that receives the boosted voltage from the boost converter and controls a rotating electric machine for travel; and a control device that performs control to limit the boosted voltage when it is determined that the rotating electric machine is in a locked state and both an accelerator and a brake are not operated to be on.

6 Claims, 8 Drawing Sheets

ELECTRICALLY POWERED VEHICLE, CONTROL DEVICE FOR ELECTRICALLY POWERED VEHICLE, AND COMPUTER READABLE MEDIUM

RELATED APPLICATION

This application claims priority to Japanese Patent Application No. 2008-288418, filed on Nov. 11, 2008, the entire content of which is incorporated herein by reference.

BACKGROUND

1. Technical Field

The present invention relates to electrically powered vehicles, control devices for electrically powered vehicles, and computer readable media.

2. Related Art

Electrically powered vehicles include hybrid vehicles driven by means of motors and engines, and electric vehicles driven by means of motors (refer to JP 2007-124746 A, JP 2007-120382 A, and JP 2007-143303 A, for example). Specifically, electrically powered vehicles include those in which an inverter is used to convert DC power into AC power, which is then supplied to a motor for travel to drive the motor.

In such electrically powered vehicles, when the motor normally rotates, AC current flows through respective elements (switching element, diode, etc.) of the inverter. However, when the motor is in a locked state (for example, stopped state or an ultra-low rotating state), a large DC current flows in a particular element of the inverter so that loss of the element increases, causing larger heat generation.

Among known configurations of electrically powered vehicles are those in which a DC voltage from a DC power source is boosted by a boost converter and the boosted DC voltage is supplied to the inverter. Configurations of this type are intended to realize higher motor output and to improve energy efficiency.

In such a configuration, because a voltage boosted by the boost converter is applied to the inverter, when the motor is in a locked state, a significantly large current flows through a particular element of the inverter, that element generates a great amount of heat.

In order to prevent this problem, JP 2007-124746 A proposes a technique to control output voltage of a boost converter when it is detected that a motor is in a locked state.

SUMMARY

When an output voltage of a boost converter is always controlled when it is detected that a motor is in a locked state as described in JP 2007-124746 A, acceleration performance at the time of a stall start may be affected.

In view of the above, the present invention advantageously provides an electrically powered vehicle capable of reducing loss of elements of an inverter while alleviating or preventing impact on acceleration performance at the time of a stall start, as well as a control device for an electrically powered vehicle and a computer readable medium.

According to one aspect of the present invention, there is provided, an electrically powered vehicle including: a boost converter that boosts a power supply voltage and outputs a boosted voltage; an inverter that receives the boosted voltage from the boost converter and controls a rotating electric machine for travel; and a control device that performs control to limit the boosted voltage when it is determined that the rotating electric machine is in a locked state and both an accelerator and a brake are not operated to be on.

According to another aspect of the present invention, there is provided, an electrically powered vehicle including: a boost converter that boosts a power supply voltage and outputs a boosted voltage; an inverter that receives the boosted voltage from the boost converter and controls a rotating electric machine for travel; and a control device that performs control to limit the boosted voltage when it is determined that the rotating electric machine is in a locked state and a parking brake is operated to be on.

According to another aspect of the present invention, there is provided, a control device of an electrically powered vehicle including a boost converter that boosts a power supply voltage and outputs a boosted voltage and an inverter that receives the boosted voltage from the boost converter and controls a rotating electric machine for travel, the control device having: an acquisition unit that acquires information indicating a rotating state of the rotating electric machine, information indicating an operating state of an accelerator, and information indicating an operating state of a brake; and a control unit that performs control, based on the information acquired by the acquisition unit, to limit the boosted voltage when it is determined that the rotating electric machine is in a locked state and both the accelerator and the brake are not operated to be on.

According to another aspect of the present invention, there is provided, a control device of an electrically powered vehicle including a boost converter that boosts a power supply voltage and outputs a boosted voltage and an inverter that receives the boosted voltage from the boost converter and controls a rotating electric machine for travel, the control device having: an acquisition unit that acquires information indicating a rotating state of the rotating electric machine and information indicating an operating state of a parking brake; and a control unit that performs control, based on the information acquired by the acquisition unit, to limit the boosted voltage when it is determined that the rotating electric machine is in a locked state and the parking brake is operated to be on.

According to another aspect of the present invention, there is provided, a computer readable medium storing a program causing a computer to execute a process for an electrically powered vehicle including a boost converter that boosts a power supply voltage and outputs a boosted voltage and an inverter that receives the boosted voltage from the boost converter and controls a rotating electric machine for travel, the process having: acquiring information indicating a rotating state of the rotating electric machine, information indicating an operating state of an accelerator, and information indicating an operating state of a brake; and performing control, based on the information acquired by the acquisition unit, to limit the boosted voltage when it is determined that the rotating electric machine is in a locked state and both the accelerator and the brake are not operated to be on.

According to another aspect of the present invention, there is provided, a computer readable medium storing a program causing a computer to execute a process for an electrically powered vehicle including a boost converter that boosts a power supply voltage and outputs a boosted voltage and an inverter that receives the boosted voltage from the boost converter and controls a rotating electric machine for travel, the process having acquiring information indicating a rotating state of the rotating electric machine and information indicating an operating state of a parking brake; and performing control, based on the information acquired by the acquisition unit, to limit the boosted voltage when it is determined that the rotating electric machine is in a locked state and the parking brake is operated to be on.

An internal combustion engine; a boost converter that boosts a power supply voltage and outputs a boosted voltage; a first inverter that receives the boosted voltage from the boost converter and controls a first rotating electric machine for travel; a second rotating electric machine; a second inverter that receives the boosted voltage from the boost converter and controls the second rotating electric machine; a power distribution mechanism that distributes power produced by the internal combustion engine to the second rotating electric machine and wheels; a control device that performs control to limit the boosted voltage when it is determined that the first rotating electric machine is in a locked state and both an accelerator and a brake are not operated to be on; and wherein the first rotating electric machine applies driving force to the wheels.

An internal combustion engine; a boost converter that boosts a power supply voltage and outputs a boosted voltage; a first inverter that receives the boosted voltage from the boost converter and controls a first rotating electric machine for travel; a second rotating electric machine; a second inverter that receives the boosted voltage from the boost converter and controls the second rotating electric machine; a power distribution mechanism that distributes power produced by the internal combustion engine to the second rotating electric machine and wheels; a control device that performs control to limit the boosted voltage when it is determined that the first rotating electric machine is in a locked state and a parking brake is operated to be on; and wherein the first rotating electric machine applies driving force to the wheels.

According to another aspect of the present invention, there is provided, a control device of an electrically powered vehicle including an internal combustion engine, a first rotating electric machine, a power distribution mechanism that distributes power of the internal combustion engine to the first rotating electric machine and wheels, a second rotating electric machine that applies driving force to the wheels, a boost converter that boosts a power supply voltage and outputs a boosted voltage, a first inverter that receives the boosted voltage from the boost converter and controls the first rotating electric machine, and a second inverter that receives the boosted voltage from the boost converter and controls the second rotating electric machine, the control device having: an acquisition unit that acquires information indicating a rotating state of the second rotating electric machine, information indicating an operating state of an accelerator, and information indicating an operating state of a brake; and a control unit that performs control, based on the information acquired by the acquisition unit, to limit the boosted voltage when it is determined that the second rotating electric machine is in a locked state and both the accelerator and the brake are not operated to be on.

According to another aspect of the present invention, there is provided, a control device of an electrically powered vehicle including an internal combustion engine, a first rotating electric machine, a power distribution mechanism that distributes power of the internal combustion engine to the first rotating electric machine and wheels, a second rotating electric machine that applies driving force to the wheels, a boost converter that boosts a power supply voltage and outputs a boosted voltage, a first inverter that receives the boosted voltage from the boost converter and controls the first rotating electric machine, and a second inverter that receives the boosted voltage from the boost converter and controls the second rotating electric machine, the control device having: an acquisition unit that acquires information indicating a rotating state of the second rotating electric machine and information indicating an operating state of a parking brake; and a control unit that performs control, based on the information acquired by the acquisition unit, to limit the boosted voltage when it is determined that the second rotating electric machine is in a locked state and the parking brake is operated to be on.

According to another aspect of the present invention, there is provided, a computer readable medium storing a program causing a computer to execute a process for an electrically powered vehicle including an internal combustion engine, a first rotating electric machine, a power distribution mechanism that distributes power of the internal combustion engine to the first rotating electric machine and wheels, a second rotating electric machine that applies driving force to the wheels, a boost converter that boosts a power supply voltage and outputs a boosted voltage, a first inverter that receives the boosted voltage from the boost converter and controls the first rotating electric machine, and a second inverter that receives the boosted voltage from the boost converter and controls the second rotating electric machine, the process having: acquiring information indicating a rotating state of the second rotating electric machine, information indicating an operating state of an accelerator, and information indicating an operating state of a brake; and performing control, based on the information acquired by the acquisition unit, to limit the boosted voltage when it is determined that the second rotating electric machine is in a locked state and both the accelerator and the brake are not operated to be on.

According to another aspect of the present invention, there is provided, a computer readable medium storing a program causing a computer to execute a process for an electrically powered vehicle including an internal combustion engine, a first rotating electric machine, a power distribution mechanism that distributes power of the internal combustion engine to the first rotating electric machine and wheels, a second rotating electric machine that applies driving force to the wheels, a boost converter that boosts a power supply voltage and outputs a boosted voltage, a first inverter that receives the boosted voltage from the boost converter and controls the first rotating electric machine, and a second inverter that receives the boosted voltage from the boost converter and controls the second rotating electric machine, the process having: acquiring information indicating a rotating state of the second rotating electric machine and information indicating an operating state of a parking brake; and performing control, based on the information acquired by the acquisition unit, to limit the boosted voltage when it is determined that the second rotating electric machine is in a locked state and the parking brake is operated to be on.

According to the present invention, it is possible to reduce loss of elements of an inverter while alleviating or preventing impact on acceleration performance at the time of a stall start.

BRIEF DESCRIPTION OF THE DRAWINGS

FIG. 5 is a time chart illustrating an example state wherein both a parking brake and an accelerator are operated to be on;

DETAILED DESCRIPTION

Hereinafter, an embodiment of the present invention will be described in accordance with the drawings.

Figure 1:
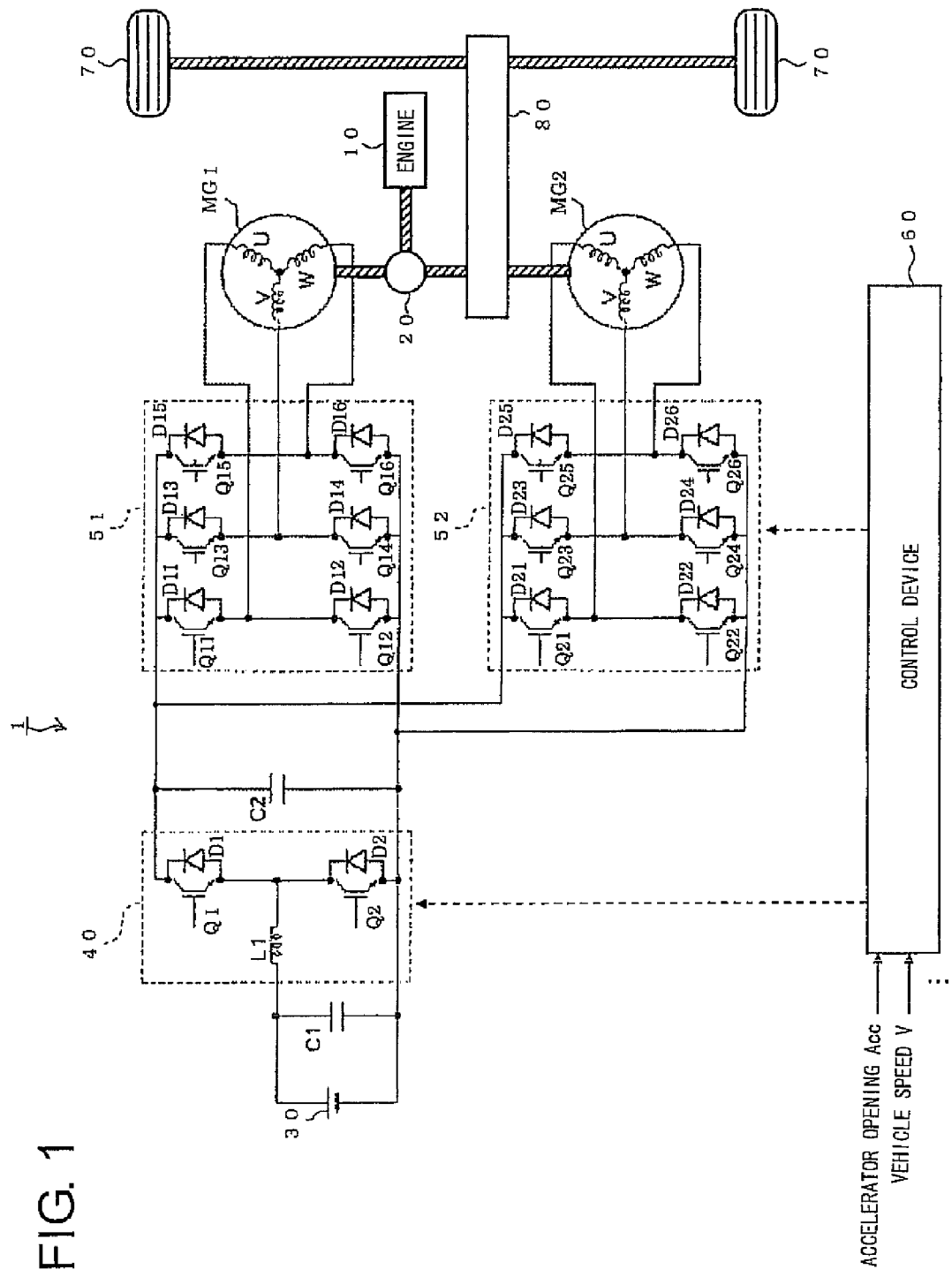
FIG. 1 is a schematic diagram showing the configuration of an example electrically powered vehicle according to an embodiment of the present invention.

FIG. 1 is a schematic diagram showing the configuration of an example electrically powered vehicle 1 according to the present embodiment. The electrically powered vehicle 1 is a vehicle having rotating electrical machines as drive sources for propelling the vehicle (traveling). In the example of FIG. 1, the electrically powered vehicle 1 is a hybrid vehicle having an internal combustion engine and rotating electrical machines as drive sources for traveling.

The electrically powered vehicle 1 shown in FIG. 1 includes an engine 10 as an internal combustion engine, motors MG1 and MG2 as rotating electrical machines, a power distribution mechanism 20, a DC power source 30, a boost converter 40, inverters 51 and 52, and a control device 60.

The engine 10 is a power source which generates power by combustion of a fuel such as gasoline or light oil. The engine 10 is linked with the power distribution mechanism 20, and the power of the engine 10 is distributed to the motor MG1 and the wheels 70 of the vehicle.

The motors MG1 and MG2 are motor generators capable of functioning as both an electric power generator and an electric motor.

In the example shown in FIG. 1, each of the motors MG1 and MG2 is a three-phase AC synchronous motor generator, including a stator with three coils of U, V, and W phases, and a rotor (not shown). One end of each the three coils of U, V, and W phases is connected to the other ends at a neutral point, while the other ends thereof are connected to the inverter 51 or 52.

The motor MG1 mainly operates as an electric power generator. Specifically, the motor MG1 generates electric power by means of a driving force of the engine 10, distributed by the power distribution mechanism 20. The electric power generated by the motor MG1 is used for driving the motor MG2 and for charging the DC power source 30.

The motor MG1 also operates as an electric motor by receiving electric power supplied from the DC power source 30, and cranking the engine 10. In other words, the motor MG1 is also used as a starter to start the engine 10.

The motor MG2 mainly operates as an electric motor. Specifically, the motor MG2 is driven by at least one of electric power stored in the DC power source 30 and electric power generated by the motor MG1. The motor MG2 is connected to the wheels 70 via a decelerator 80, and the driving force of the motor MG2 is applied to the wheels 70 via the decelerator 80. Thereby, the motor MG2 causes the vehicle to travel by assisting the engine 10 or causes the vehicle to travel only by the driving force of the motor MG2.

When the vehicle is applied with regenerative control, the motor MG2 is rotated by the wheels 70 and operates as an electric power generator. The regenerative electric power generated by the motor MG2 is used for charging the DC power source 30.

Figure 2:
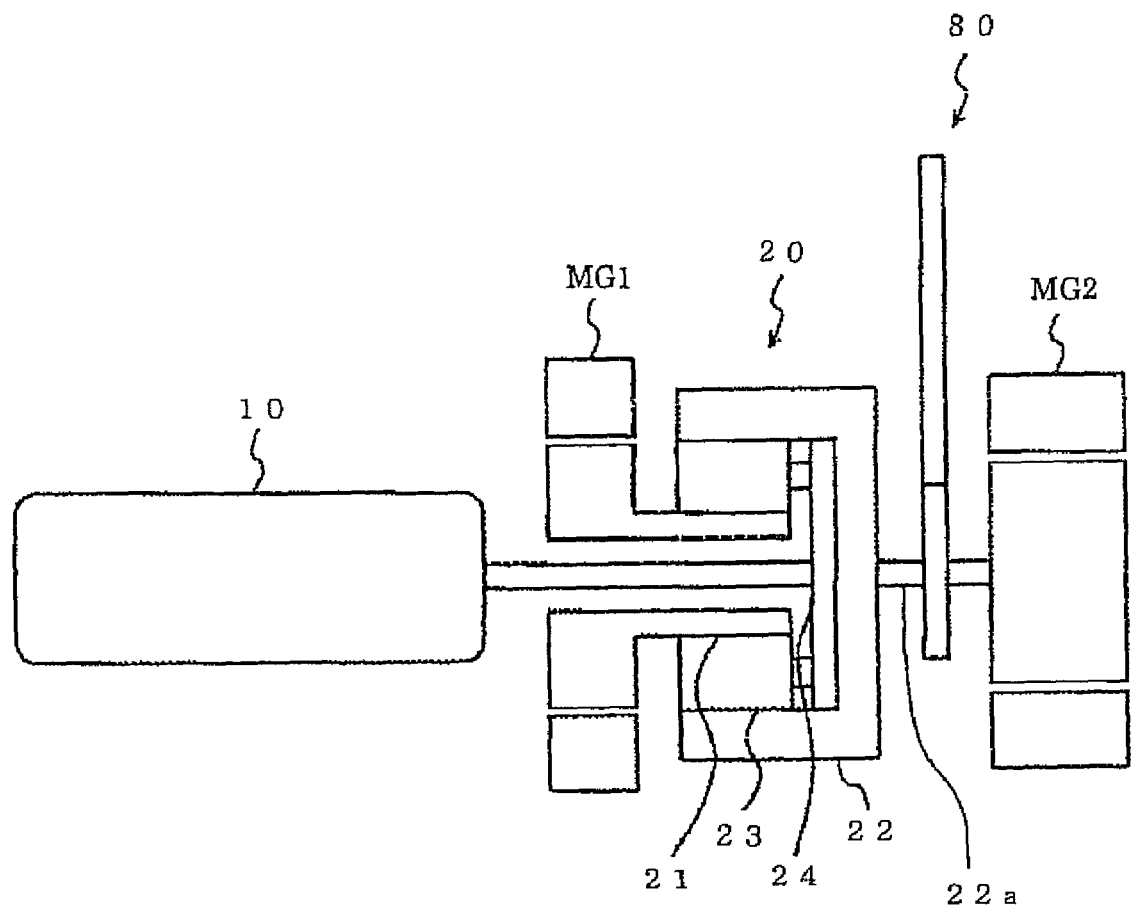
FIG. 2 is a schematic diagram showing the configuration of an example power distribution mechanism.

The power distribution mechanism 20 distributes the power of the engine 10 to the motor MG1 and the wheels 70. Specifically, the power distribution mechanism 20 is linked to the engine 10, the motor MG1, and the motor MG2, and distributes power among them. As shown in FIG. 2, the power distribution mechanism 20 includes a sun gear 21 as an external gear, a ring gear 22 as an internal gear, a plurality of pinion gears 23 engaging with the sun gear 21 and the ring gear 22, and a carrier 24 holding the pinion gears 23 rotatably and revolvably, and is configured as a planetary gear mechanism in which the sun gear 21, the ring gear 22, and the carrier 24 are rotating elements, for example. The axis of rotation of the carrier 24 is connected to the output shaft of the engine 10, and the axis of rotation of the sun gear 21 is connected to the axis of rotation of the motor MG1, and a ring gear shaft 22*a* which is the axis of rotation of the ring gear 22 is connected to the axis of rotation of the motor MG2 and is also connected to the wheels 70 via the decelerator 80.

The DC power source 30 is a power source for supplying electric power to the motors MG1 and MG2, and is a chargeable electricity storage device which may be a battery such as a nickel hydride battery or a lithium ion battery, or a capacitor, for example.

The boost converter 40 boosts a voltage from the DC power source 30 (that is, power supply voltage) and supplies the boosted voltage to the inverters 51 and 52. The boost converter 40 also steps down voltages supplied from the inverters 51 and 52 and charges the DC power source 30. That is, the boost converter 40 converts voltages between the DC power source 30 and the inverters 51 and 52.

In the example shown in FIG. 1, the boost converter 40 includes a reactor L1, switching elements (e.g., IGBT) Q1 and Q2, and diodes D1 and D2. The switching elements Q1 and Q2 are connected in series between the power supply line and the earth line of the inverters 51 and 52. The collector of the switching element Q1 of the upper arm is connected to the power supply line, and the emitter of the switching element Q2 of the lower arm is connected to the earth line. The middle point between the switching elements Q1 and Q2, that is, a contact between the emitter of the switching element Q1 and the collector of the switching element Q2, is connected to one end of the reactor L1. The other end of the reactor L1 is connected to the positive electrode of the DC power source 30. Further, the emitter of the switching element Q2 is connected to the negative electrode of the DC power source 30. Between the collector and the emitter of each of the switching elements Q1 and Q2, the diode D1 or D2 is arranged so as to flow electric current from the emitter side to the collector side. Between the other end of the reactor L1 and the earth line, a smoothing capacitor C1 is connected, and between the collector of the switching element Q1 and the earth line, a smoothing capacitor C2 is connected. The boost converter 40 converts voltages by switching (turning on/off) the switching elements Q1 and Q2 based on control signals from the control device 60.

The inverter 51 receives a boosted voltage from the boost converter 40 and controls the motor MG1. Specifically, the inverter 51 converts DC power supplied from the boost converter 40 into AC power and supplies the AC power to the motor MG1 to thereby rotatingly drive the motor MG1. The inverter 51 also converts AC power generated by the motor MG1 into DC power and supplies the DC power to the boost converter 40. That is, the inverter 51 converts electric power between the boost converter 40 and the motor MG1.

In the example of FIG. 1, the inverter 51 is configured to include arms of U phase, V phase, and W phase, arranged in parallel with each other between the power supply line and the earth line. The U-phase arm is composed of switching elements Q11 and Q12 connected in series, the V-phase arm is composed of switching elements Q13 and Q14 connected in series, and the W-phase arm is composed of switching elements Q15 and Q16 connected in series. The switching elements Q11 to Q16 are IGBT, for example. In each of the switching elements Q11 to Q16, a diode D11, D12, D13, D14, D15, or D16 is arranged between the collector and the emitter thereof for flowing electric current from the emitter side to the collector side. The middle point between the switching elements Q11 and Q12 of the U-phase arm is connected to the U-phase coil of the motor MG1, and the middle point between the switching elements Q13 and Q14 of the V-phase arm is connected to the V-phase coil of the motor MG1, and the middle point between the switching elements Q15 and Q16 of the W-phase arm is connected to the W-phase coil of the motor MG1. The inverter 51 converts electric power by switching (turning on/off) the switching elements Q11 to Q16 based on control signals from the control device 60.

The inverter 52 receives a boosted voltage from the boost converter 40 and controls the motor MG2. Specifically, the inverter 52 converts DC power supplied from the boost converter 40 into AC power and supplies the AC power to the motor MG2 to thereby rotatingly drive the motor MG2. The inverter 52 also converts AC power generated by the motor MG2 into DC power and supplies the DC power to the boost converter 40. That is, the inverter 52 converts electric power between the boost converter 40 and the motor MG2.

In the example of FIG. 1, the inverter 52 is configured to include arms of U phase, V phase, and W phase, arranged in parallel with each other between the power supply line and the earth line. The U-phase arm is composed of switching elements Q21 and Q22 connected in series, the V-phase arm is composed of switching elements Q23 and Q24 connected in series, and the W-phase arm is composed of switching elements Q25 and Q26 connected in series. The switching elements Q21 to Q26 are IGBT, for example. In each of the switching elements Q21 to Q26, a diode D21, D22, D23, D24, D25, or D26 is arranged between the collector and the emitter thereof for flowing electric current from the emitter side to the collector side. The middle point between the switching elements Q21 and Q22 of the U-phase arm is connected to the U-phase coil of the motor MG2, the middle point between the switching elements Q23 and Q24 of the V-phase arm is connected to the V-phase coil of the motor MG2, and the middle point between the switching elements Q25 and Q26 of the W-phase arm is connected to the W-phase coil of the motor MG2. The inverter 52 converts electric power by switching (turning on/off) the switching elements Q21 to Q26 based on control signals from the control device 60.

The control device 60 controls the boost converter 40 and the inverters 51 and 52 to thereby control operation of the motors MG1 and MG2. The control device 60 may be realized by cooperation between a hardware resource and software, which is an ECU (Electronic Control Unit), for example. Specifically, the functions of the control device 60 may be realized in such a manner that a control program stored in a storage medium such as a ROM (Read Only Memory) is read by the main memory and executed by a CPU (Central Processing Unit). The control program may be provided by being stored in a computer readable medium, or provided through communications as data signals. However, the control device 60 may be realized only by hardware. Further, the control device 60 may be realized physically as a single device or by a plurality of devices. For example, the control device 60 may be realized by an engine ECU controlling the engine 10, a motor ECU controlling the motors MG1 and MG2, and a hybrid ECU controlling these elements.

Data necessary for control is input to the control device 60. This data includes an accelerator opening Acc from an accelerator position sensor which detects the amount of an accelerator pedal being pressed and a vehicle speed V from a vehicle speed sensor.

Based on the data such as the accelerator opening Acc and the vehicle speed V, the control device 60 calculates a torque demand to be output to the wheels 70 (or ring gear shaft 22a), and controls operation of the engine 10 and the motors MG1 and MG2 such that a power demand corresponding to the torque demand is output to the wheels 70 (or ring gear shaft 22a).

Figure 3:
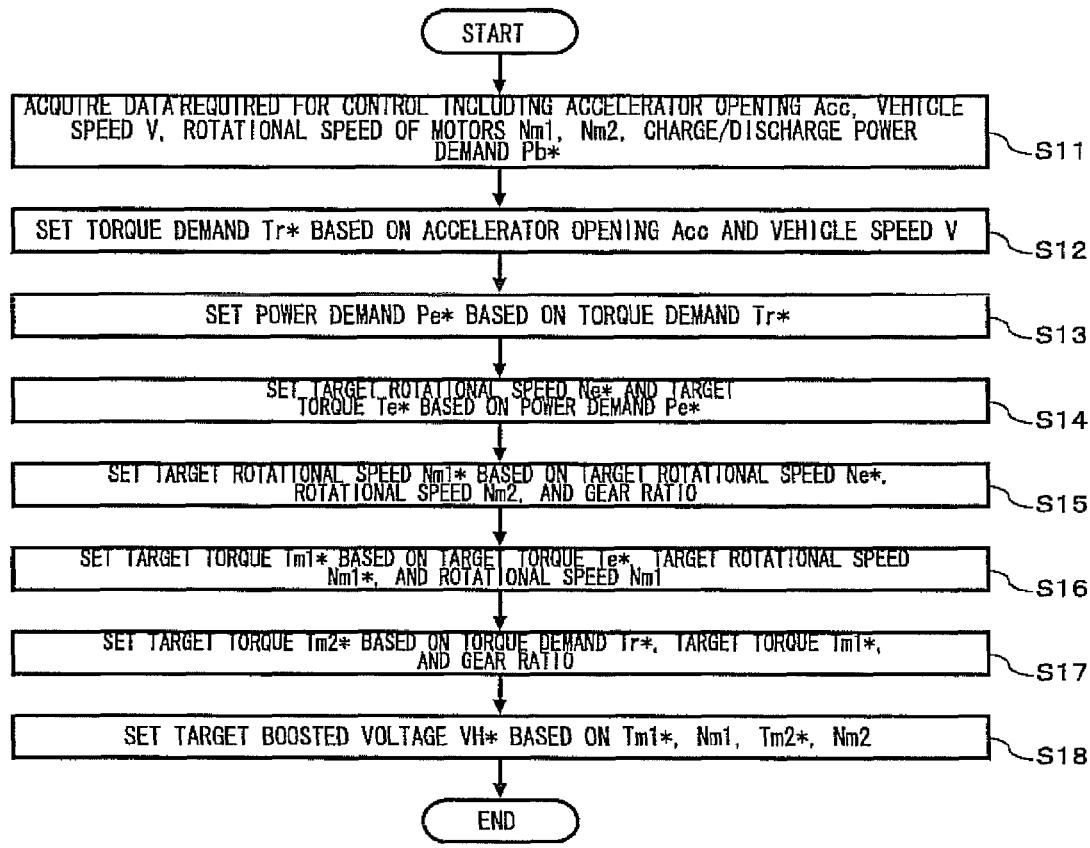
FIG. 3 is a flowchart of a drive control process.

Specifically, the control device 60 repeatedly performs a drive controlling process shown in FIG. 3 at predetermined time intervals.

In the drive control process of FIG. 3, the control device 60 first acquires data necessary for control (S11). The data includes an accelerator opening Acc, a vehicle speed V, the rotational speeds Nm1 and Nm2 of the motors MG1 and MG2, and a charge/discharge power demand Pb* required by the DC power source 30. The rotational speeds Nm1 and Nm2 of the motors MG1 and MG2 are calculated based on an output of a rotational position detection sensor which detects rotational positions of the rotors of the motors MG1 and MG2, for example. The charge/discharge power demand Pb* is calculated based on the remaining capacity (SOC: State of Charge) of the DC power source 30, for example.

Then, based on the accelerator opening Acc and the vehicle speed V, the control device 60 sets, as torque required for the vehicle, a torque demand Tr* to be output to the ring gear shaft 22a serving as a drive shaft linked to the wheels 70 (S12).

Then, based on the torque demand Tr* set, the control device 60 sets a power demand Pe* required for the engine 10 (S13). For example, the control device 60 calculates the sum of a result of multiplying the torque demand Tr* by the rotational speed of the ring gear shaft 22a and the charge/discharge power demand Pb*, and sets this sum as the power demand Pe*. The rotational speed of the ring gear shaft 22a can be calculated from the vehicle speed V and the rotational speed Nm2 of the motor MG2.

Then, based on the power demand Pe* set, the control device 60 sets the target rotational speed Ne* and target torque Te* as an operating point for operating the engine 10 (S14).

Then, based on the target rotational speed Ne* of the engine 10, the rotational speed Nm2 of the motor MG2, and the gear ratio of the power distribution mechanism 20, the control device 60 sets the target rotational speed Nm1* of the motor MG1 (S15).

Then, based on the target torque Te* of the engine 10, the target rotational speed Nm1* of the motor MG1, and the rotational speed Nm1 of the motor MG1, the control device 60 sets a target torque Tm1* of the motor MG1 (S16).

Then, based on the torque demand Tr* to be output to the ring gear shaft 22a, the target torque Tm1* of the motor MG1, and the gear ratio of the power distribution mechanism 20, the control device 60 sets a target torque Tm2* of the motor MG2 (S17).

Then, the control device 60 sets a target boosted voltage VH* which should be output by the boost converter 40 (S18). More specifically, based on the target torque Tm1* and the rotational speed Nm1 of the motor MG1, the control device 60 calculates a voltage value Vm1 required for driving the motor MG1, and based on the target torque Tm2* and the rotational speed Nm2 of the motor MG2, calculates a voltage value Vm2 required for driving the motor MG2, and determines the larger of the voltage values Vm1 and Vm2 to be the target boosted voltage VH*.

When the target rotational speed NE* and the target torque Te* of the engine 10, the target boosted voltage VH* of the boost converter 40, the target torque Tm1* and Tm2* of the motors MG1 and MG2 have been set through the drive controlling process described above, the control device 60 controls the engine 10, the boost converter 40, and the inverters 51 and 52 based on these values. Specifically, the control device 60 controls intake air volume, fuel injection, and ignition of the engine 10 such that the engine 10 operates at an operating point indicated by the target rotational speed Ne* and the target torque Te*. The control device 60 also controls switching of the boost converter 40 such that the boosted voltage of the boost converter 40 (that is, input voltage to the inverters 51 and 52) becomes the target boosted voltage VH*. Further, the control device 60 controls switching of the inverter 51 such that the motor MG1 outputs the target torque Tm1*, and controls switching of the inverter 52 such that the motor MG2 outputs the target torque Tm2*.

In the electrically powered vehicle 1 described above, when the motor MG2 is in a locked state, large DC current flows in a particular element of the inverter 52 so that loss of the element increases, whereby the heat generation becomes larger. It should be noted that a locked state of the motor MG2 is a state where the rotational speed of the motor MG2 is zero or almost zero, which means a state where the motor MG2 is stopped or rotates at an ultraslow speed.

When the motor MG2 is in a locked state, when the accelerator pedal is pressed so that the accelerator opening is increased, the power required for the vehicle increases, so that the power demand for the engine 10 also increases. In accordance with an increase in the power demand, the rotational speed of the engine 10 increases, whereby the rotational speed of the motor MG1 increases. If the rotational speed of the motor MG2 is zero, the rotational speed of the motor MG1 and the rotational speed of the engine 10 have a proportional relationship. As such, when the rotational speed of the engine 10 increases, the rotational speed of the motor MG1 also increases in proportion thereto. When the rotational speed of the motor MG1 increases, the boosted voltage is raised, accordingly. As the boosted voltage is also supplied to the inverter 52, a significantly large current flows in a particular element of the inverter 52.

From a standpoint of reducing loss of the element of the inverter 52, in the present embodiment, the control device 60 limits the boosted voltage of the boost converter 40 when the motor MG2 is in a locked state. Specifically, the control device 60 determines whether or not the motor MG2 is in a locked state, and if it is determined that the motor MG2 is in a locked state, the control device 60 performs control to lower the upper limit value of the boosted voltage of the boost converter 40.

However, if the boosted voltage is always limited when the motor MG2 is in a locked state, the acceleration performance at the time of a stall start may be affected. This occurs because when the upper limit value of the boosted voltage is lowered, the upper limit value of the rotational speed of the motor MG1 is also lowered, so that the upper limit value of the rotational speed of the engine 10 is shifted to the low rotation side. When the rotational speed of the motor MG2 is zero, as the rotational speed of the engine 10 is in proportion to the rotational speed of the motor MG1, if the upper limit of the rotational speed of the motor MG1 is lowered, the upper limit of the rotational speed of the engine 10 is also proportionally lowered.

As such, in the present embodiment, the control device 60 controls the boosted voltage as described below in order to prevent deterioration in the acceleration performance at the time of a stall start. Hereinafter, first and second modes of limiting the boosted voltage of the control device 60 in the present embodiment will be described.

First Mode

Figure 4:
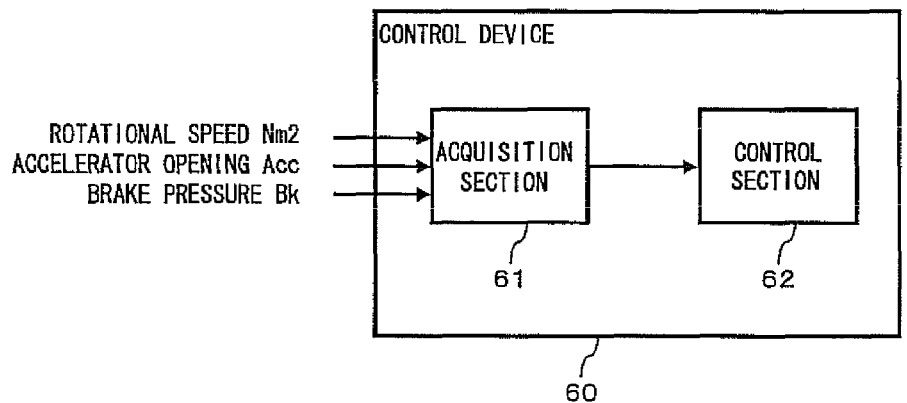
FIG. 4 is a block diagram showing a functional configuration regarding a limitation of a boosted voltage of a control device according to a first mode.

FIG. 4 is a block diagram showing the functional configuration regarding a limitation of a boosted voltage of the control device 60 according to a first mode. In FIG. 4, the control device 60 includes an acquisition section 61 and a control section 62.

The acquisition section 61 acquires information indicating a rotating state of the motor MG2, information indicating an operating state of the accelerator, and information indicating an operating state of the brake. For example, the acquisition section 61 acquires the rotational speed Nm2 of the motor MG2 calculated based on an output of the rotational position detection sensor, the accelerator opening Acc from the accelerator position sensor, and a brake pressure Bk from a brake sensor.

The control section 62 performs control to limit the boosted voltage of the boost converter 40 if it is determined that the motor MG2 is in a locked state and that both the accelerator and the brake are not operated to be on (or not engaged), based on the information acquired by the acquisition section 61. A state where both the accelerator and the brake are operated to be on is, for example, a state where both the accelerator pedal and the brake pedal are pressed, which is labeled a stalled state.

Specifically, the control section 62 determines whether or not the motor MG2 is in a locked state and whether or not the motor MG2 is in a stalled state. When the control section 62 determines that the motor MG2 is in a locked state and is not in a stalled state, the control section 62 limits the boosted voltage. In contrast, if the control section 62 determines that the motor MG2 is in a stalled state although it is in a locked state, the control section 62 does not limit the boosted voltage.

For example, in the case where an upper limit value of the boosted voltage is a maximum boosted voltage VHmax when the motor MG2 is not in a locked state (which means, normal state), if the control section 62 determines that the motor MG2 is a locked state and is not in a stalled state, the control section 62 sets an upper limit value of the boosted voltage to be a limited upper limit voltage VHlim which is lower than the maximum boosted voltage VHmax. On the other hand, if the control section 62 determines that the motor MG2 is in a stalled state even though it is in a locked state, the control section 62 sets the upper limit value of the boosted voltage to be the maximum boosted voltage VHmax. That is, the control section 62 does not limit the boosted voltage and allows the voltage to rise to the maximum boosted voltage VHmax.

When the voltage is allowed to rise to the maximum boosted voltage VHmax, such as in a normal state, the control device 60 performs drive-control such that the boosted voltage does not exceed the maximum boosted voltage VHmax. For example, the control device 60 sets an operating point (torque, rotational speed) of the engine 10 such that an operating point (torque, rotational speed) of the motor MG1 falls within the operational range of the motor MG1 allowed for the maximum boosted voltage VHmax.

In contrast, when the upper limit value of the boosted voltage is set to the limited upper limit voltage VHlim, such as in a boosting controlled state, the control device 60 performs drive-control such that the boosted voltage does not exceed the limited upper limit voltage VHlim. For example, the control device 60 sets an operating point (torque, rotational speed) of the engine 10 such that an operating point (torque, rotational speed) of the motor MG1 falls within the operational range of the motor MG1 allowed for the limited upper limit voltage VHlim.

It should be noted that the operational range of the motor MG1 allowed for the limited upper limit voltage VHlim is narrower than the operational range allowed for the maximum boosted voltage VHmax, and is limited to the low rotational side. As such, when the boosted voltage is limited, the rotational speed of the motor MG1 is limited to the low rotation side, and the rotational speed of the engine 10 is also limited to the low rotation side, accordingly. In such a case, the torque of the engine 10 increases as the rotational speed of the engine 10 decreases. As such, when the boosted voltage is limited, the operating point of the engine 10 is shifted to the row rotation side and the high torque side.

Determination of whether or not the motor MG2 is in a locked state may be performed as follows, for example. The control section 62 determines whether or not the rotational speed Nm2 of the motor MG2 is equal to the predetermined rotational speed Nth or less, and, when it is so determined, the control section 62 determines that the motor MG2 is in a locked state, while, if the rotational speed Nm2 of the motor MG2 is greater than the predetermined rotational speed Nth, determines that the motor MG2 is not in a locked state.

Here, the predetermined rotational speed Nth is set such that, for example, the rotational speed of the motor MG2 is always maintained at a predetermined rotational speed Nth or less in a state wherein both the parking brake and the accelerator are operated to be on, which is the most severe state thermally. The parking brake is a braking device mainly used for parking the vehicle, and employs a mechanism which applies braking force to the wheels so as to lock the wheels, for example.

Figure 5:
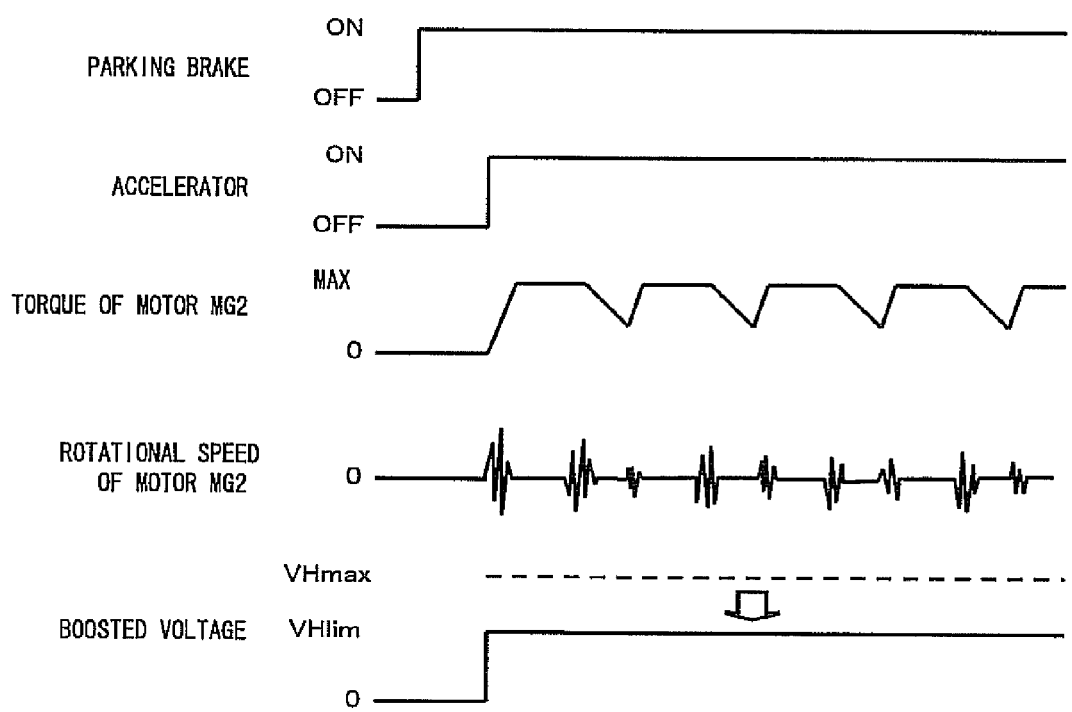

FIG. 5 is an a time chart showing an example state wherein both the parking brake and the accelerator are operated to be on. FIG. 5 shows an operating state of the parking brake, an operating state of an accelerator, torque of the motor MG2, the rotational speed of the motor MG2, and a boosted voltage. As shown in FIG. 5, in a state where both the parking brake and the accelerator are on, the rotational speed of the motor MG2 fluctuates. The predetermined rotational speed Nth is set while considering the fluctuation of the rotational speed. For example, the predetermined rotational speed is set such that a peak value in the fluctuation of the rotational speed of the motor MG2 becomes the predetermined rotational speed Nth or less. Although the torque of the motor MG2 is periodically reduced in FIG. 5, this is due to torque removing control for protecting the elements of the inverter 52.

Determination of a stalled state is performed as follows, for example. The control section 62 determines whether an accelerator opening Acc is equal to a predetermined value or larger, and whether a brake pressure Bk is equal to a predetermined value or larger, and, if it is determined that both the accelerator opening Acc and the brake pressure Bk equal or exceed their respective predetermined values, the control section 62 determines that the motor MG2 is in a stalled state, and, if not, the control section 62 determines that it is not in a stalled state.

As described above, in the present mode, the boosted voltage is not limited when the motor MG2 is in a stalled state even though the motor MG2 is in a locked state, in order to prevent deterioration in acceleration performance at the time of a stall start. However, when the stalled state has been released, if limitation of the boosted voltage is started immediately after the release, the rotational speed of the engine 10 is once shifted to the low rotation side, which adversely affects the acceleration performance.

In view of the above, in a preferable mode, the control section 62 does not limit the boosted voltage for a predetermined period of time after the stalled state has been released. For example, the control section 62 allows the maximum boosted voltage VHmax until a predetermined time period t1 has elapsed after the control section 62 has determined that the stalled state had been released, even if the rotational speed Nm2 of the motor MG2 is the less than or equal to the predetermined rotational speed Nth.

The predetermined time period t1 is set to satisfy the following conditions (a) and (b), and may be set to about one second, for example:

(a) At the time of acceleration after the stalled state has been released, the rotational speed Nm2 of the motor MG2 exceeds the predetermined rotational speed Nth within the predetermined time period t1; and (b) After the stalled state has been released, even if the motor MG2 becomes a locked state again, no problem is caused thermally in the elements of the inverter 52.

Figure 6:
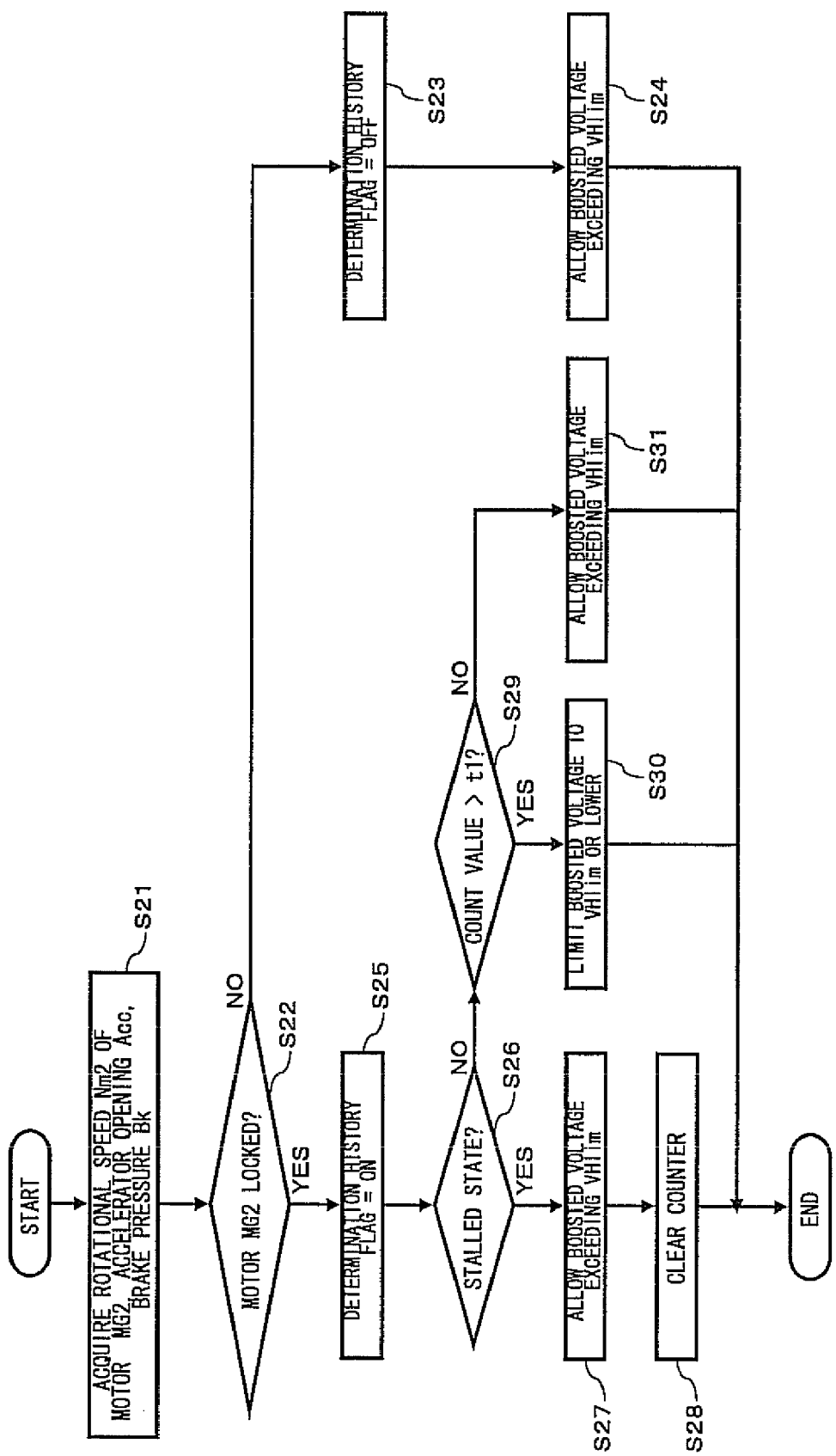
FIG. 6 is a flowchart showing an example operation of the control device of the first mode.

FIG. 6 is a flowchart showing an example operation of the control device 60 in the first mode. Hereinafter, the operation of the control device 60 in the first mode will be described with reference to FIG. 6. It should be noted that the following processes are repeatedly performed.

In this mode, the control device 60 has a counter as a timing unit to time the elapsed time. This counter is a free running counter, its initial value is set to be the predetermined time period t1 (e.g., one second) or longer, and the counter stops counting at a maximum limit value and maintains the maximum limit value. The control device 60 stores a determination history flag, and the initial state of the flag is on. Further, the initial value of the upper limit value of the boosted voltage is the limited upper limit voltage VHlim. Further, regarding the rotational speed Nm2 of the motor MG2, positive indicates a vehicle forward direction and negative indicates a vehicle backward direction.

First, the control device 60 acquires the rotational speed Nm2 of the motor MG2, the acceleration opening Acc, and the brake pressure Bk (S21).

Then, the control device 60 determines whether or not the motor MG2 is in a locked state (S22).

Specifically, if the shift range is a forward range, the control device 60 performs determination in the following manner.

When the determination history flag is on, the control device 60 determines that the motor MG2 is in a locked state if the rotational speed Nm2 of the motor MG2 is smaller than a threshold NF1, that is, when Nm2<NF1, and if this is not the case, the control device 60 determines that the motor MG2 is not in a locked state.

When the determination history flag is off, the control device 60 determines that the motor MG2 is in a locked state if the rotational speed Nm2 of the motor MG2 is smaller than a threshold NF2, that is, when Nm2<NF2, and if this it not the case, the control device 60 determines that the motor MG2 is not in a locked state. In this mode, the condition NF1>NF2>0 is established.

In contrast, if the shift range is a backward range, the control device 60 performs determination in the following manner.

When the determination history flag is on, the control device 60 determines that the motor MG2 is in a locked state if the rotational speed Nm2 of the motor MG2 is larger than a threshold NB1, that is, when Nm2>NB1, and if this is not the case, the control device 60 determines that the motor MG2 is not in a locked state.

When the determination history flag is off, the control device 60 determines that the motor MG2 is in a locked state if the rotational speed Nm2 of the motor MG2 is larger than a threshold NB2, that is, when Nm2>NB2, and if this it not the case, the control device 60 determines that the motor MG2 is not in a locked state. In this mode, the relationship NB1<NB2<0 is set. Further, |NF1|=|NB1| and |NF2|=|NB2| are also established, for example.

When it is determined that the motor MG2 is not in a locked state (S22: NO), the control device 60 sets the determination history flag to be off (S23), and allows the voltage to be boosted exceeding the limited upper limit voltage VHlim (S24). For example, the control device 60 sets the maximum boosted voltage VHmax to be the upper limit voltage of the boosted voltage. In this mode, VHmax>VHlim is established.

On the other hand, when it is determined that motor MG2 is in a locked state (S22: YES), the control device 60 sets the determination history flag to be on (S25), and then determines whether the motor MG2 is in a stalled state (S26). Specifically, the control device 60 determines that the motor MG2 is in a stalled state if the acceleration opening Acc is a predetermined value or larger and the brake pressure Bk is a predetermined value or larger, and determines that the motor MG2 is not in a stalled state if this is not the case.

If it is determined that the motor MG2 is in a stalled state (S26: YES), the control device 60 allows the voltage to be boosted to a value exceeding the limited upper limit voltage VHlim (S27). For example, the control device 60 sets the maximum boosted voltage VHmax to be the upper limit value of the boosted voltage. Then, the control device 60 clears the counter to be zero (S28).

In contrast, if it is determined that the motor MG2 is not in a stalled state (S26: NO), the control device 60 determines whether or not the counter value exceeds the predetermined time period t1 (S29).

If it is determined that the counter value exceeds the predetermined time period t1 (S29: YES), the control device 60 limits the boosted voltage to be the limited upper limit voltage VHlim or lower (S30). For example, the control device 60 sets the limited upper limit voltage VHlim to be the upper limit of the boosted voltage.

In contrast, if it is determined that the counter value does not exceed the predetermined time period t1 (S29: NO), the control device 60 allows the voltage to be boosted to a value exceeding the limited upper limit voltage VHlim (S31). For example, the control device 60 sets the maximum boosted voltage VHmax to the upper limit value of the boosted voltage.

It should be noted that in the example of FIG. 6, the reason for providing the determination history flag and switching a threshold for determining a locked state corresponding to the determination history of the locked state is to provide a hysteresis property to the determination of a locked state. However, it is also acceptable to omit the determination history flag and not to switch a threshold for determining a locked state.

Further, in the example of FIG. 6, the threshold for determining a locked state of the motor MG2 is set for just one of positive or negative, and not to the other. Specifically, if the shift range is a forward range, the threshold is provided only to the positive side, while if the shift range is a backward range, a threshold is provided only to the negative side, in order to prevent the limitation of the boosted voltage from being released when the vehicle goes back at the time of hill start or the like. More specifically, at the time of hill start for example, there is a case where the vehicle once goes back (the motor MG2 rotates negatively) and then goes forward (the motor MG2 rotates positively). In this case, if the boosted voltage limitation is released when the vehicle goes back, the motor will enter a locked state when the vehicle goes forward in a state where the boosted voltage is high, so that heat generation of the elements of the inverter 52 becomes large. Considering these circumstances, in the example of FIG. 6, a threshold is set to only one of either the positive or negative sides. However, it is also possible to set thresholds for determining a locked state in both the negative and positive sides. For example, the motor MG2 may be determined to be in a locked state if an absolute value |Nm2| of the rotational speed of the motor MG2 is smaller than a predetermined threshold Nth (>0).

Figure 7:
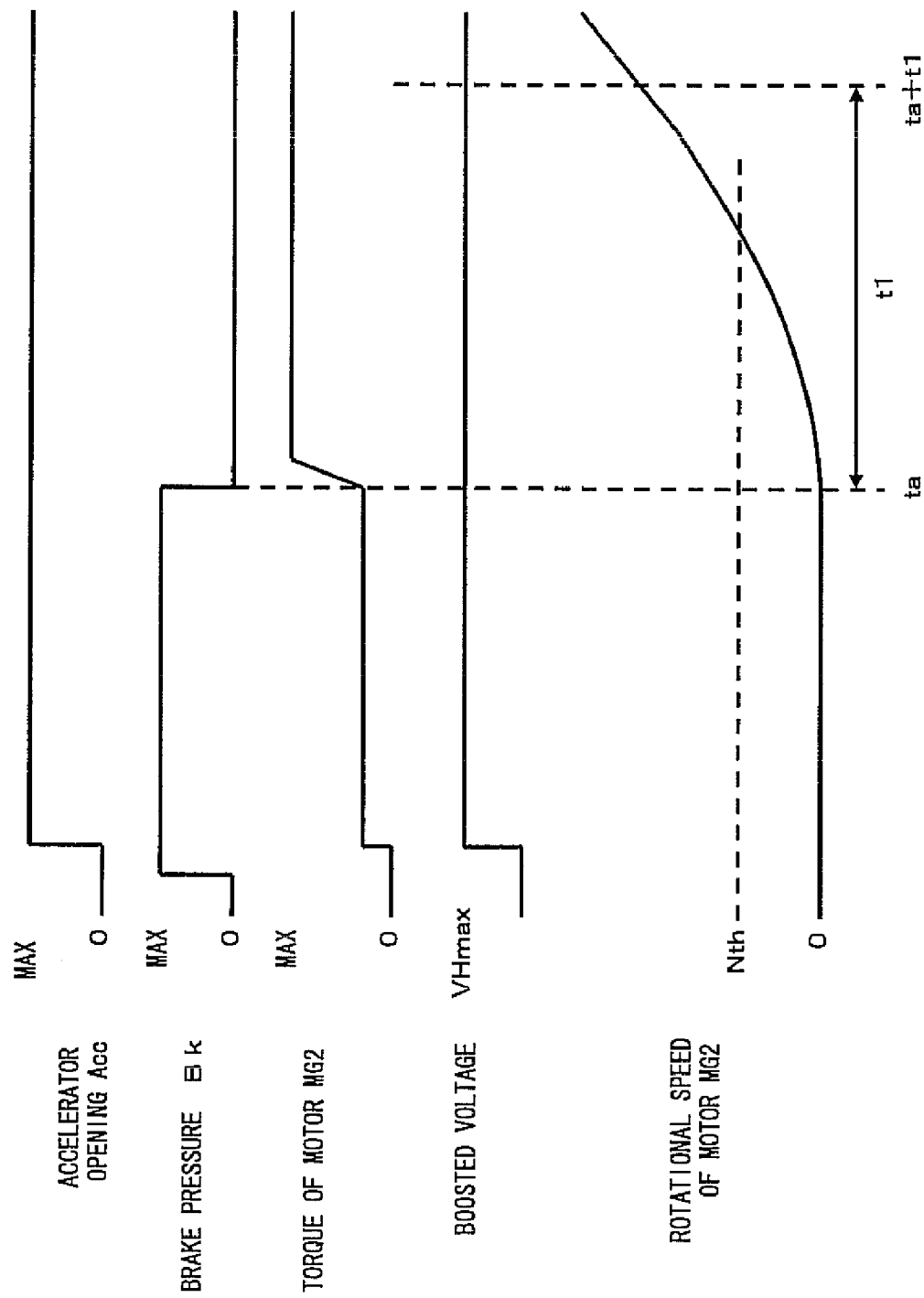
FIG. 7 is an example time chart at the time of a stall start.

FIG. 7 is an example time chart illustrating a stall start. Specifically, FIG. 7 shows an example in which the driver presses both the accelerator and the brake when the vehicle is stopped, and then releases the brake while continuing to press the accelerator.

In FIG. 7, initially, the rotational speed Nm2 of the motor MG2 is almost zero, the brake pressure Bk is near its maximum, and the accelerator opening is in fully opened position. In this case, the control device 60 determines that the motor MG2 is in a stalled state, and allows the voltage to be boosted up to the maximum boosted voltage VHmax. Further, as the control device 60 has detected the stalled state, the control device 60 has performed control to limit the torque of the motor MG2 to a predetermined value or less.

At a time ta, although the stalled state is released when the brake is turned off, boosting control is not performed until a further predetermined time period t1 has elapsed, that is, until a time (ta+t1), and the voltage is allowed to be boosted up to the maximum boosted voltage VHmax. Additionally, when the brake is turned off, the rotational speed Nm2 of the motor MG2 increases. The rotational speed Nm2 of the motor MG2 exceeds the predetermined rotational speed Nth before the predetermined time period t1 elapses, and the locked state is released. In an example such as this, boosting control will not be performed even after the predetermined time period t1 elapses.

As described above, in the first mode, if it is determined that the rotating electric machine for travel is in a locked state and that both the accelerator and the brake are not operated to be on, control to limit the boosted voltage is performed. As such, according to the present mode, it is possible to reduce loss of the elements of the inverter while alleviating or preventing impact on the acceleration performance at the time of a stall start. Specifically, even if the rotating electric machine is in a locked state, when it is determined that both the accelerator and the brake are operated to be on, it is possible to prevent deterioration of the acceleration performance at the time of a stall start by not limiting the boosted voltage. Further, because it is possible to reduce loss of the elements of the inverter, and heat generation of the elements of the inverter can be suppressed for example, so that the size of the elements of the inverter can be reduced.

Second Mode

Although a second mode differs from the first mode in the conditions for determining whether or not to limit the boosted voltage, the second mode is otherwise very similar to the first mode as described above. As such, the following description will focus on aspects of the second mode which differ from those of the first mode, and description of aspects or components which correspond to those already described will for the most part not be repeated.

Figure 8:
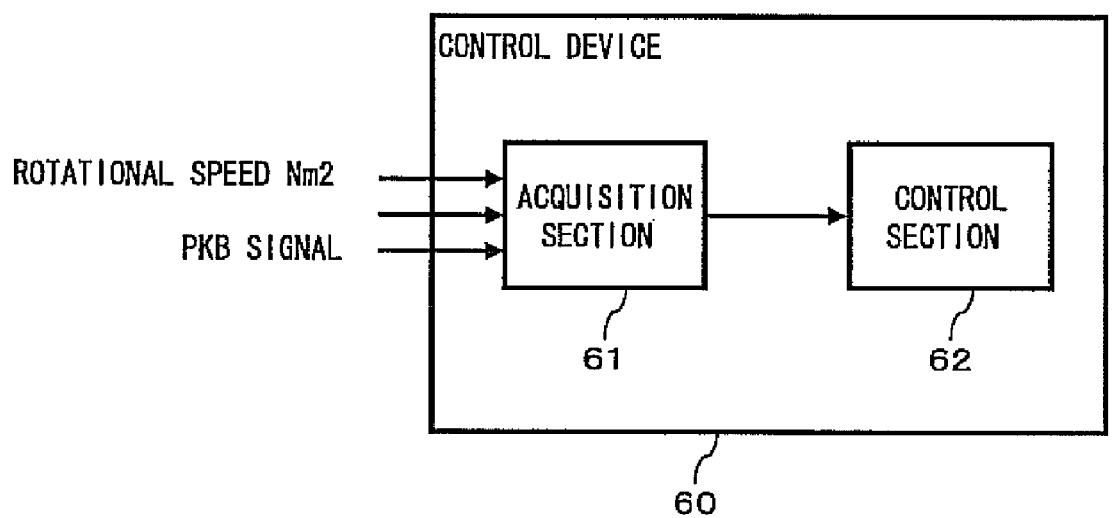
FIG. 8 is a block diagram showing a functional configuration for a limitation of a boosted voltage of a control device according to a second mode.

FIG. 8 is a block diagram showing the functional configuration related to limitation of the boosted voltage of the control device 60 in the second mode. In the example shown FIG. 8, the control device 60 includes an acquisition section 61 and a control section 62.

In the second mode, the acquisition section 61 acquires information indicating a rotating state of the motor MG2 and information indicating an operating state of the parking brake. For example, the acquisition section 61 acquires the rotational speed Nm2 of the motor MG2 calculated based on an output of a rotating position detection sensor, and a parking brake signal PKB from a parking brake switch which detects the state of engagement "on/off state" of the parking brake.

The control section 62 performs control to limit the boosted voltage of the boost converter 40 when it is determined that the motor MG2 is in a locked state and the parking brake is operated to be on, based on the information acquired by the acquisition section 61. A state where the parking brake is operated to be on may be, for example, a state wherein the parking brake pedal or the side brake are operated to be on and the braking force of the parking brake is applied to the wheels.

Specifically, the control section 62 determines whether or not the motor MG2 is in a locked state and whether or not the parking brake is set to an engaged or operated to be on (hereinafter simply referred to as "PKB is on"). If the control section 62 determines that the motor MG2 is in a locked state and the PKB is on, the control section 62 limits the boosted voltage. On the other hand, if the control section 62 determines that the PKB is not on although the motor MG2 is in a locked state, the control section 62 does not limit the boosted voltage.

For example, in the case where an upper limit value of the boosted voltage when the motor MG2 is not in a locked state (a normal state) is the maximum boosted voltage VHmax, if the control section 62 determines that the motor MG2 is in a locked state and the PKB is on, the control section 62 sets the upper limit value of the boosted voltage to be the limited upper limit voltage VHlim which is lower than the maximum boosted voltage VHmax. On the other hand, although the motor MG2 is in a locked state, if the control section 62 determines that the PKB is not on, the control section 62 sets the upper limit voltage of the boosted voltage to be the maximum boosted voltage VHmax. The control section 62 does not limit the boosted voltage and allows the voltage to be boosted up to the maximum boosted voltage VHmax.

Figure 9:
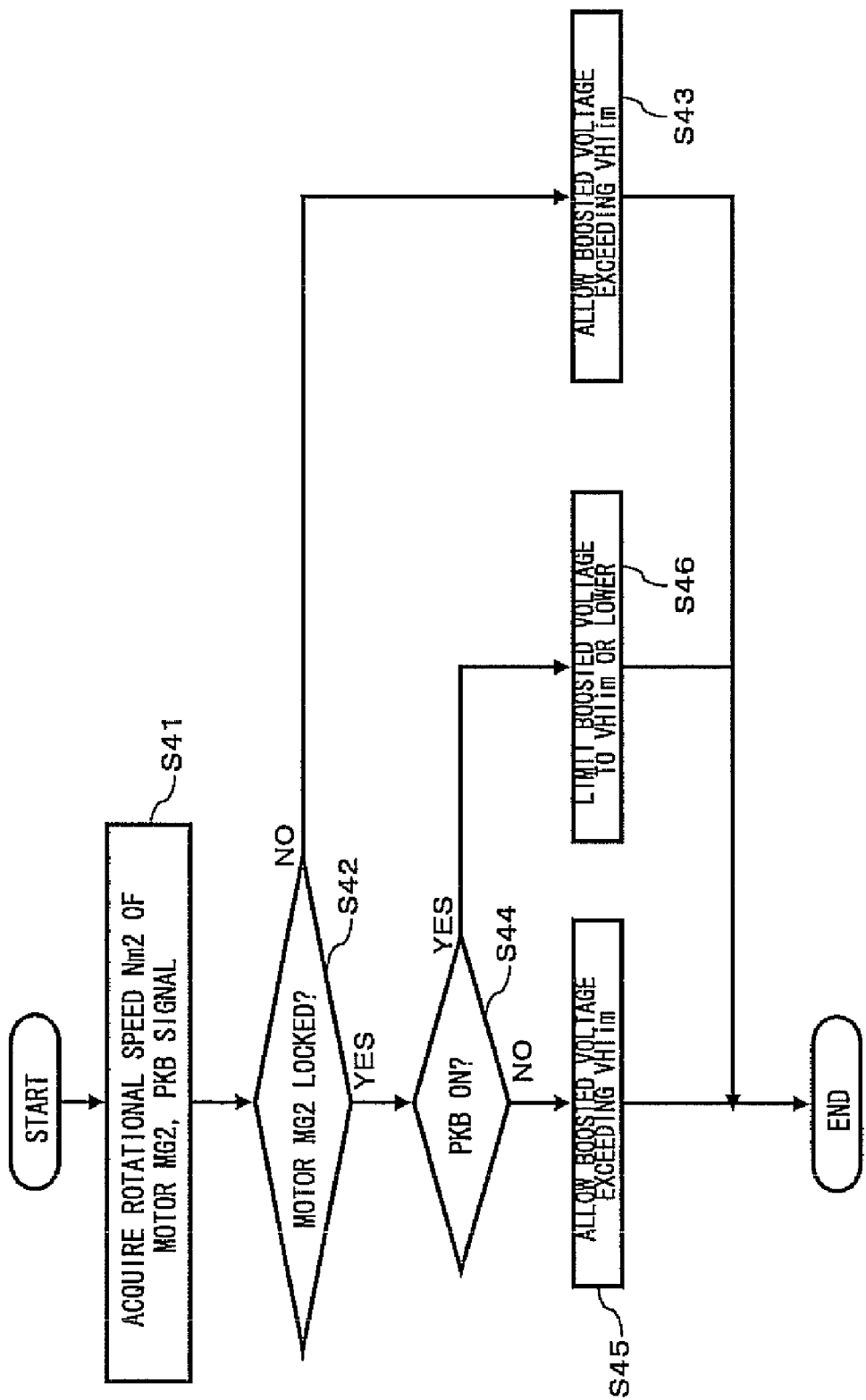
FIG. 9 is a flowchart showing an example operation of the control device of the second mode.

FIG. 9 is a flowchart showing an example operation of the control device 60 in the second mode. Hereinafter, the operation of the control device 60 in the second mode will be described with reference to FIG. 9. It should be noted that the following processes are performed repeatedly.

In this mode, the initial value of the upper limit value of the boosted voltage is the limited upper limit voltage VHlim. Further, the rotational speed "Nm2" of the motor MG2 indicates an absolute value of the rotational speed.

First, the control device 60 acquires the rotational speed Nm2 of the motor MG2 and a parking brake (PKB) signal (S41).

Then, the control device 60 determines whether or not the motor MG2 is in a locked state (S42). In this mode, if the rotational speed Nm2 of the motor MG2 is smaller than a predetermined rotational speed Nth, in other words when Nm2<Nth, the control device 60 determines that the motor MG2 is in a locked state, and, if this is not the case, the control device 60 determines that the motor MG2 is not in a locked state.

If it is determined that the motor MG2 is not in a locked state (S42: NO), the control device 60 allows the voltage to be boosted exceeding the limited upper limit voltage VHlim (S43). For example, the control device 60 sets the maximum boosted voltage VHmax to be the upper limit value of the boosted voltage. In this mode, the relationship VHmax>VHlim is established.

In contrast, if it is determined that the motor MG2 is in a locked state (S42: YES), the control device 60 determines whether or not the PKB is on, based on the PKB signal (S44).

If it is determined that the PKB is not on (S44: NO), the control device 60 allows the voltage to be boosted exceeding the limited upper limit voltage VHlim (S45). For example, the control device 60 sets the upper limit value of the boosted voltage to be the maximum boosted voltage VHmax.

In contrast, if it is determined that the PKB is on (S44: YES), the control device 60 limits the boosted voltage to the limited upper limit voltage VHlim or lower (S46). For example, the control device 60 sets the upper limit value of the boosted voltage to be the limited upper limit voltage VHlim.

It should be noted that although the threshold for determining a locked state is not switched in the example of FIG. 9, it is acceptable to switch the threshold for determining the locked state in accordance with the determination history of the locked state and the shift range as in the case shown in FIG. 6.

Further, in the example of FIG. 9, although the rotational speed Nm2 of the motor MG2 is treated as an absolute value and a threshold for determining a locked state is substantially set in both positive and negative rotational directions of the motor MG2, it is also acceptable to set the threshold relative to just one of either the positive or negative directions, as in the case shown in FIG. 6.

As described above, in the second mode, if it is determined that the rotating electric machine for travel is in a locked state and that the parking brake is operated to be on, control to limit the boosted voltage is performed. As such, according to the present mode, it is possible to reduce loss of the elements of the inverter while alleviating or preventing impact on the acceleration performance at the time of a stall start. Specifically, as the boosted voltage can be limited only when the parking brake is operated to be on, it is possible to prevent deterioration in the acceleration performance at the time of a stall start. Further, as it is possible to reduce loss of the elements of the inverter, heat generation of the elements of the inverter can be suppressed for example, so that the size of the elements of the inverter can be reduced.

Further, because control to limit the boosted voltage is performed when the rotating electric machine for travel is in a locked state and the parking brake is operated to be on, when the vehicle is started on a slope when the parking brake is on, the engine operating point is shifted to the high torque side, and the engine torque increases, whereby the climbing performance can be improved.

The present invention is not limited to the embodiment described above, and various changes may be made without departing from the spirit of the present invention.

For example, the present invention is not limited to an electrically powered vehicle of a type having an engine and two rotating electric machines as shown in FIG. 1, and is applicable to other types of electrically powered vehicles. Specifically, the present invention is applicable to any electrically powered vehicle if the vehicle includes a boost converter which boosts a power supply voltage and outputs the boosted voltage and an inverter which receives the boosted voltage from the boost converter and controls a rotating electric machine for travel, and has a configuration in which the acceleration performance at the time of a stall start is impaired when the boosted voltage is limited.

What is claimed is:

1. An electrically powered vehicle comprising:
a boost converter that boosts a power supply voltage and outputs a boosted voltage;
an inverter that receives the boosted voltage from the boost converter and controls a rotating electric machine for travel; and
a control device that performs control to limit the boosted voltage when it is determined that the rotating electric machine is in a locked state and both an accelerator and a brake with a brake pedal are not operated to be on, and which does not perform control to limit the boosted voltage when it is determined that the rotating electric machine is in a locked state and both the accelerator and the brake with the brake pedal are operated to be on.

2. The electrically powered vehicle of claim 1, further comprising:
an internal combustion engine;
an additional rotating electric machine;
a power distribution mechanism that distributes power produced by the internal combustion engine to the additional rotating electric machine and wheels; and
an additional inverter that receives the boosted voltage from the boost converter and controls the additional rotating electric machine;
wherein the rotating electric machine applies driving force to the wheels.

3. A control device of an electrically powered vehicle including a boost converter that boosts a power supply voltage and outputs a boosted voltage and an inverter that receives the boosted voltage from the boost converter and controls a rotating electric machine for travel, the control device comprising:
an acquisition unit that acquires information indicating a rotating state of the rotating electric machine, information indicating an operating state of an accelerator, and information indicating an operating state of a brake pedal; and
a control unit that performs control, based on the information acquired by the acquisition unit, to limit the boosted voltage when it is determined that the rotating electric machine is in a locked state and both the accelerator and the brake with the brake pedal are not operated to be on, and which does not perform control to limit the boosted voltage when it is determined that the rotating electric machine is in a locked state and both the accelerator and the brake with the brake pedal are operated to be on.

4. The control device of an electrically powered vehicle of claim 3, further including an internal combustion engine, an additional rotating electric machine, a power distribution mechanism that distributes power of the internal combustion engine to the additional rotating electric machine and wheels, a boost converter that boosts a power supply voltage and outputs a boosted voltage, an additional inverter that receives the boosted voltage from the boost converter and controls the additional rotating electric machine, and wherein the rotating electric machine applies driving force to the wheels.

5. A computer readable medium storing a program causing a computer to execute a process for an electrically powered vehicle including a boost converter that boosts a power supply voltage and outputs a boosted voltage and an inverter that receives the boosted voltage from the boost converter and controls a rotating electric machine for travel, the process comprising:
acquiring information indicating a rotating state of the rotating electric machine, information indicating an operating state of an accelerator, and information indicating an operating state of a brake pedal; and
performing control, based on the information acquired by the acquisition unit, to limit the boosted voltage when it is determined that the rotating electric machine is in a locked state and both the accelerator and the brake with the brake pedal are not operated to be on, and which does not performing control to limit the boosted voltage when it is determined that the rotating electric machine is in a locked state and both the accelerator and the brake with the brake pedal are operated to be on.

6. The computer readable medium storing a program causing a computer to execute a process for an electrically powered vehicle of claim 5, further including an internal combustion engine, an additional rotating electric machine, a power distribution mechanism that distributes power of the internal combustion engine to the additional rotating electric machine and wheels, an additional inverter that receives the boosted voltage from the boost converter and controls the additional rotating electric machine, and wherein the rotating electric machine applies driving force to the wheels.

* * * * *

UNITED STATES PATENT AND TRADEMARK OFFICE
CERTIFICATE OF CORRECTION

PATENT NO. : 8,091,666 B2  
APPLICATION NO. : 12/615494  
DATED : January 10, 2012  
INVENTOR(S) : Natsuki Nozawa et al.

Page 1 of 1

It is certified that error appears in the above-identified patent and that said Letters Patent is hereby corrected as shown below:

At column 4, line number 61, delete ",""", insert --;--.

At column 10, line number 46, after MG2 is, insert --in--.

At column 11, line number 19, delete "row", insert --low--.

At column 11, line number 38, after Fig 5 is, delete "an".

At column 13, line number 19, after that, insert --the--.

At column 15, line number 3, after shown, insert --in--.

In the Claims:

At column 18, line number 30, delete "performing", insert --perform--.

Signed and Sealed this  
Second Day of October, 2012

David J. Kappos  
*Director of the United States Patent and Trademark Office*